US006665778B1

United States Patent
Assaf

(10) Patent No.: US 6,665,778 B1
(45) Date of Patent: Dec. 16, 2003

(54) SYSTEM AND METHOD FOR STORAGE OF DEVICE PERFORMANCE DATA

(75) Inventor: Mahmoud Assaf, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/404,423

(22) Filed: Sep. 23, 1999

(51) Int. Cl.$^7$ ............................................. G06F 12/00
(52) U.S. Cl. .......................... 711/156; 714/25; 714/30; 714/37; 714/39
(58) Field of Search ........................... 701/14; 711/156; 714/25, 30, 37, 39

(56) References Cited

U.S. PATENT DOCUMENTS

| | | | | |
|---|---|---|---|---|
| 4,814,892 A | * | 3/1989 | Igarashi ...................... 358/296 |
| 5,193,179 A | * | 3/1993 | Laprade et al. ................ 714/47 |
| 5,287,363 A | * | 2/1994 | Wolf et al. .................. 714/718 |
| 5,581,482 A | * | 12/1996 | Wiedenman et al. ....... 702/186 |
| 6,047,165 A | * | 4/2000 | Wright et al. ................ 340/945 |
| 6,118,065 A | * | 9/2000 | Haruyama .................... 84/609 |
| 6,167,538 A | * | 12/2000 | Neufeld et al. ............... 714/47 |
| 6,269,412 B1 | * | 7/2001 | Liu et al. ...................... 710/19 |
| 6,279,125 B1 | * | 8/2001 | Klein .......................... 714/38 |
| 6,338,150 B1 | * | 1/2002 | Johnson et al. ............... 714/39 |
| 6,351,724 B1 | * | 2/2002 | Klassen et al. ............. 702/186 |
| 6,367,037 B1 | * | 4/2002 | Remer et al. ................. 714/47 |
| 6,405,327 B1 | * | 6/2002 | Sipple et al. ................. 714/39 |
| 6,434,715 B1 | * | 8/2002 | Andersen ..................... 714/39 |
| 6,453,345 B2 | * | 9/2002 | Trcka et al. ................ 709/224 |

* cited by examiner

Primary Examiner—Hiep T. Nguyen
(74) Attorney, Agent, or Firm—Scott Charles Richardson

(57) ABSTRACT

The present invention is directed to an apparatus and method for storage of device performance data and repair systems. In an exemplary embodiment, a data recorder includes a memory device connected to at least one device for storing performance data obtained from the device wherein the memory device is accessible after failure of the device. In an additional embodiment of the present invention, a system and method for optimizing device performance includes determining an operating system type, saving the operating system type in a data recorder and loading a firmware module based on the saved type. In a further exemplary embodiment of the present invention, a system and method for preventing loss of device performance data includes obtaining performance data from a device and storing the performance data on a data recorder wherein the data recorder is accessible after failure of the device. It may be desirable to store performance data to the data recorder so as not to affect the operation of the device. In yet another exemplary embodiment, a system and method for restoring a corrupted data structure with device self stored repair tools includes determining whether a data structure of an operating system is corrupted and restoring the data structure from data recorder data if the data structure is corrupted.

40 Claims, 9 Drawing Sheets

SYSTEM AND METHOD FOR STORAGE OF DEVICE PERFORMANCE DATA

FIELD OF THE INVENTION

The present invention generally relates to the field of electronic devices, and particularly to device diagnosis and storage of device performance data.

BACKGROUND OF THE INVENTION

Failure of hardware or software systems due to device operation may cause a loss of essential data. One method used to avoid this problem is S.M.A.R.T. technology. S.M.A.R.T. is an acronym that stands for self-monitoring analysis reporting tool. S.M.A.R.T. monitors performance indicators and is intended to provide users with an early warning of impending device failure. However, in many instances device failure is sudden and may occur with little or no advanced warning. This may be particularly harmful in storage devices, where failure may occur before the user has the opportunity to save information to other media. One reason for the lack of sufficient warning time is that S.M.A.R.T. reports few of the performance indicators, less than twenty (20), of what a device is able to report, which may be more than 150 in the case of a storage device. For example, additional performance indicators are recorded in storage devices on the media, in most cases in a vendor specific area. Typically, only the vendor may access and analyze the data contained in this area using special vendor unique commands and diagnostic tools. If device failure was caused by mechanical or chipset failure, the data stored in the vendor unique area may be lost or only partially recovered by the manufacturer. For instance, in the case of chipsets or spindle motor failures in a hard drive, swapping a damaged printed circuit board or replacing a damaged spindle may help to recover the data. But, in the case of head damage, scratches or anything related to the voice coil, head, or media, the performance indicators could be lost. The loss of the performance indicators makes it very difficult to determine the root cause of device failure. Other traditional methods of determining the cause of failure, such as a failure analysis, require an extended period of time and effort before a report is issued. For example, in some cases, performing a failure analysis requires opening the device assembly in a "clean room" to prevent contamination of the media.

Repair of the device may be greatly simplified by knowing the precise cause of the device failure. For instance, the user may know which part of the device to repair, and whether the device can be repaired. Additionally, performance data is valuable even if it was not possible to repair the device. By making it easy to access this data even after device failure, a detailed record of what caused the device to fail can be obtained. The scope and value of quality control is increased by having a detailed picture of why the devices failed. This would allow a greater sampling to be taken to determine the cause of failure of the devices.

Furthermore, disk drive vendors are challenged today by system manufacturers to optimize the drive for every operating system to load its content faster, to retrieve or pre-fetch the data even faster and most importantly to win magazine reviews. To optimize a drive for all of the above, vendors often have difficulty accommodating the changes required by differing operating systems under a single firmware or a single cache algorithm so as to eliminate disk seeking operations and the overhead due to rotational latency delays. Therefore, a vendor may wish to have different firmware modules optimized for different operating systems.

For the forgoing reasons, there is a need for a data recorder that may be used to store device performance data that is easily accessed after device failure. Additionally, there is a need for a data recorder that stores software tools to repair a damaged operating system or device driver software program and to optimize a device for a specific operating system.

SUMMARY OF THE INVENTION

The present invention addresses such problems by connecting a data recorder to the device. The data recorder includes a memory device that stores performance data. Performance data may include data traditionally stored in the vendor unique area on a hard disk drive. In this way, the data recorder is accessible after device failure, thereby making it easier to determine the cause of failure of the device.

The data recorder may be disposed on the device so that it may be removed and examined. Further, information obtained may then influence future designs of the device so that past failures may be rectified. For instance, it may be determined that a certain component of the device is prone to failure. That portion of the device may then be improved, such as by redesigning the component or deriving the part from another manufacturer.

Additionally, a data recorder may store software tools to repair damaged operating systems, such as device driver software. The operating system may become corrupted thereby denying the user access even without a mechanical or printed circuit board failure. The operating system may be repaired by having a data recorder control the restoration of the operating system. By having an image of the original download saved, such as the operating system, the data recorder may initiate a repair program. The repair program may be initiated by simply inserting a floppy disk or similar removable media in the information handling system to replace the lost data sector by sector as it was shipped from the system manufacturer or replace the lost data in an updated version by utilizing the performance data contained in a data recorder. The repair program may also be initiated through vendor unique commands, such as hidden copy and restore. For example, the data recorder stores information regarding the latest operating system and device drivers used by the device or information handling system so that this data is restored by the data recorder should the original version become corrupted.

Furthermore, the data recorder may optimize device performance by specifying a particular module to load for a corresponding operating system. To determine which module to load when power is applied to the device, the data recorder and its program utilities pinpoint which operating system is utilized and then indicate which module to load based on the indicated operating system.

The present invention is directed to a system and method for storage of device performance data. In an exemplary embodiment, a data recorder includes a memory device connected to at least one device for storing performance data obtained from the device wherein the memory device is accessible after failure of the device. In an additional embodiment of the present invention, a system and method for optimizing device performance includes determining an operating system type, saving the operating system type in a data recorder and loading a firmware module based on the saved type. In a further exemplary embodiment of the present invention, a system and method for preventing loss of device performance data includes obtaining performance data from a device and storing the performance data on a data recorder wherein the data recorder is accessible after failure of the device. It may be desirable to store performance data to the data recorder so as not to affect the operation of the device. In yet another exemplary embodiment, a system and method for restoring a corrupted data structure with device self-stored repair tools includes determining whether a data structure of an operating system is corrupted and restoring the data structure from data recorder data if the data structure is corrupted.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to preferred embodiments of the invention, examples of which are illustrated in the accompanying drawings.

Figure 1:
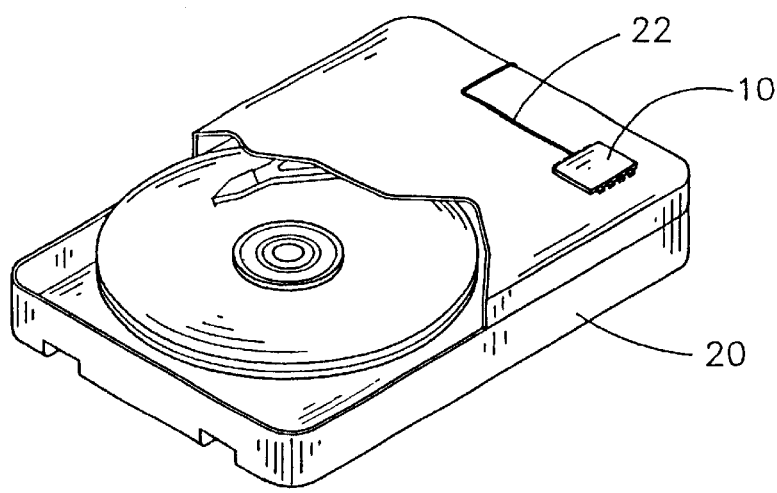
FIG. 1 is an isometric view of an exemplary device employing the present invention.
Figure 2:
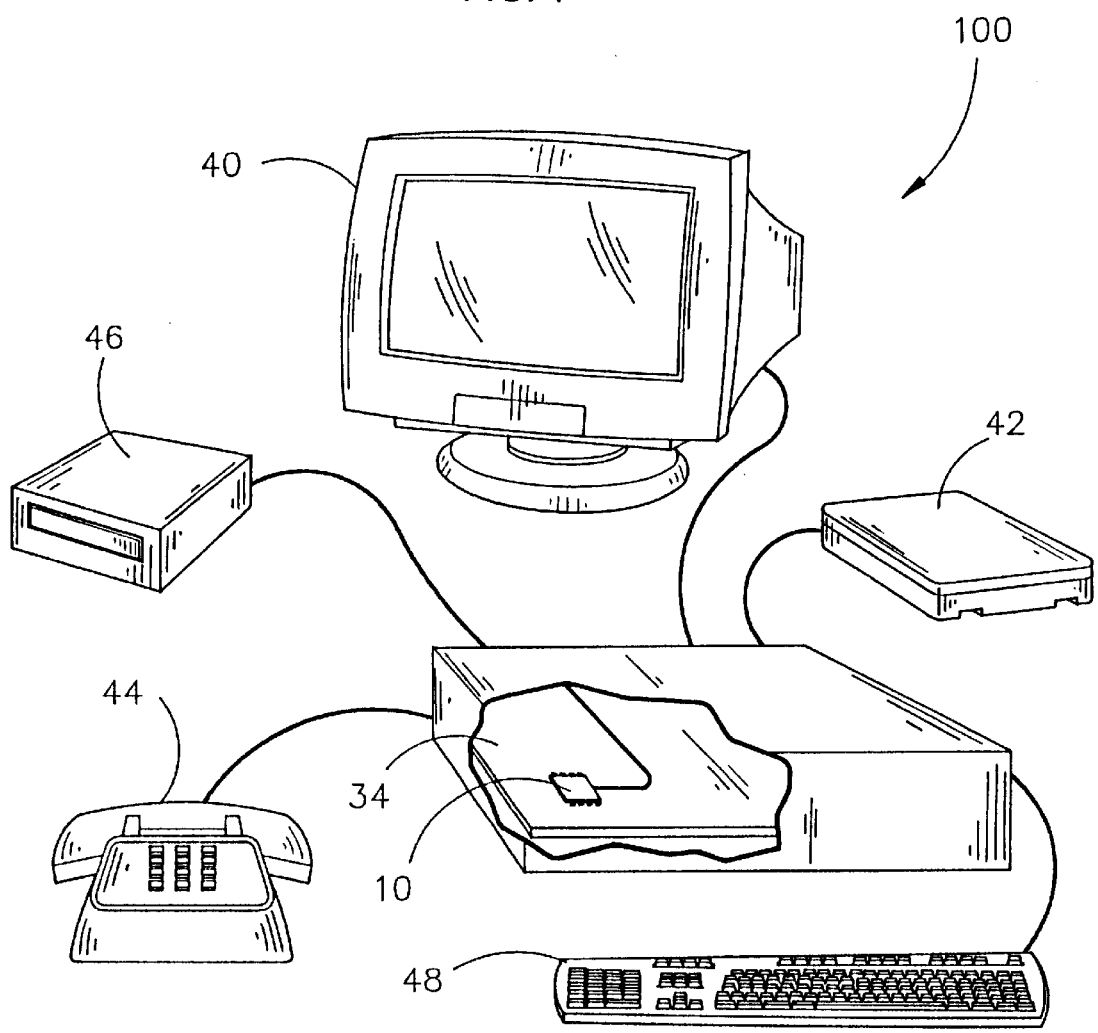
FIG. 2 is an isometric view of an exemplary information handling system operable to employ the present invention.
Figure 3:
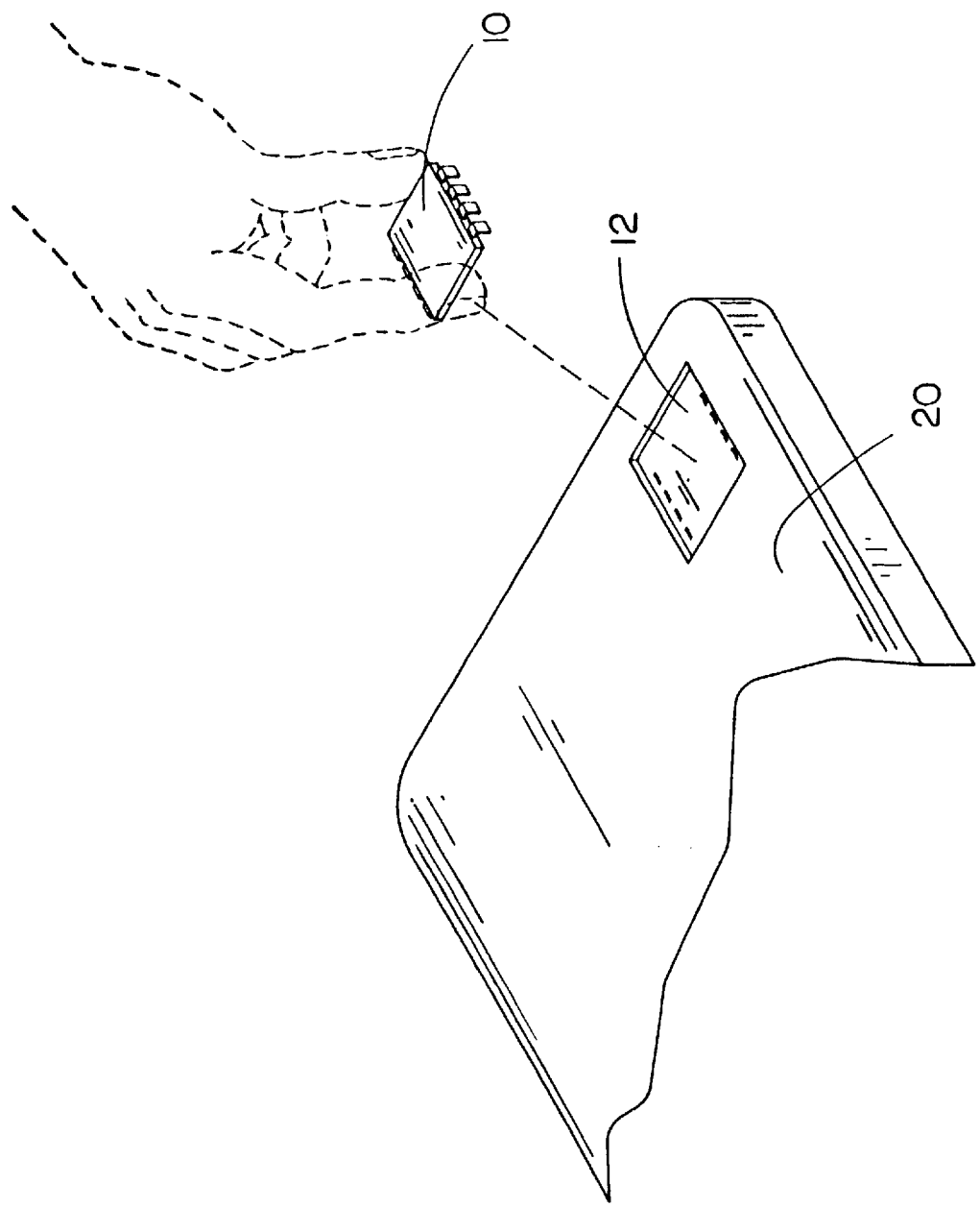
FIG. 3 is an isometric view of an exemplary device employing the present invention as shown in FIG. 1, wherein a memory device is disposed so as to be capable of easy removal and installation.

Referring now to FIGS. 1 through 3 an exemplary embodiment of a system and method for storage of device performance data is shown. In FIG. 1, a data recorder 10 is disposed proximally to a device 20. The data recorder 10 may include semiconductor based memory and processors, including electrically erasable programmable read-only memory (EEPROM), flash ram, programmable read-only memory (PROM), erasable programmable read-only memory (EPROM), and a digital signal processor (DSP) with memory. The data recorder may also include a variety of non-semiconductor based memories, including but not limited to magnetic tape, drum, floppy disk, hard disk, redundant array of independent disks (RAID), optical, laser disk, writeable compact disc read-only memory (CD-ROM), digital versatile disk (DVD), a floppy disk for utilization in a floppy disk drive, a floptical disk for utilization in a floptical drive, or a personal computer memory card for utilization in a personal computer card slot as contemplated by a person of ordinary skill in the art.

The device 20 is operably coupled via a connector 22 to the data recorder 10 so the data recorder 10 may store performance data regarding the device 20. Performance data may include error codes, diagnostic information, data structures, and device specific information regarding the device 20. For example, in one embodiment the device includes a hard disk drive so that performance data including diagnostic data typically recorded on the media of the hard disk drive itself. In most cases, only the vendor himself could analyze the data stored on the media through special vendor unique commands and diagnostic tools. Storing data to the data recorder 10 enables a comprehensive view of the operation of the device 20 to be accessed after failure of a malfunctioning device without the data becoming corrupted by the device 20.

A data recorder may be part of a device 20 design as shown in FIG. 1 or included in an information handling system 100, an example of which is shown in FIG. 2. An interface may be included so that the data may be easily accessed, such as through the device interface 22 already contained on the device 20 for interfacing the device 20 with the system 100. If a user of the device including a data recorder 10 desires to know more about the health of the devices connected to the system, the data from the data recorder 10 may contain sufficient information to appraise the user of any necessary or desired actions regarding the devices. The action may include a backup of the data stored in a hard disk drive or suggesting which component of a device to replace or repair. For example, when the device 20 is a hard disk drive, the data recorder informs the user that the device is malfunctioning, such as by losing rotational speed or overheating, and therefore a backup should be commenced. Therefore, the user is able to take action, such as by saving the information stored in a hard disk drive. The user would also have an informed idea as to why the device is failing.

Referring now to FIG. 2, the data recorder 10 is shown designed into an information handling system 100, such as the main board, or motherboard, contained in the system 34. This enables the data recorder 10 to be programmed to monitor, test, and collect data about all the devices available in the information handling system 100. For instance, the data recorder 10 may store performance information from a variety of devices such as a monitor 40, hard disk drive 42, modem 44, CD-ROM (compact disk read-only-memory) 46, keyboard 48, components of a motherboard 34, or other components or peripherals interfaced with or connected to the information handling system 100. Other features may be supported by the data recorder 10, including basic input/output system (BIOS) image, BIOS menu support to test system peripherals including memory, tracking overall system temperature, removal or addition of new peripherals, and write protecting any device for security reasons.

The data recorder 10 may be programmed to reflect device specific information. For instance, the data recorder may be programmed to reflect product data, such as the system company, the device company, the device model, serial number, firmware revision, manufacturing date and interface type. The data recorder may also be programmed to reflect component information, such as the head/media manufacturer in a disk drive. Therefore, when a device is taken back to the factory, not only could the data recorder supply the cause of failure, but also who made the specific part and when the part was manufactured.

Referring now to FIG. 3, an exemplary embodiment of the present invention is shown wherein the data recorder 10 is mounted on a device 20 so that it may be easily removed. Performance data is stored to the data recorder 10 during operation of the device 20. Preferably, the data recorder is installed so that the data recorder may be updated by the device without affecting the operation of the device. If the device 20 fails, a user may gain access to the performance data by removing the data recorder 10 from a data recorder connection 12 disposed on the device 20. In this way, the root cause of the failure may be determined by examining the performance data stored in the data recorder 10 without engaging in a time consuming failure analysis of the device. The data recorder 10 may then be read by a device or system separate from the device 20 to obtain the performance data contained in the data recorder 10.

Performance data may permit the user to determine if the device 20 is capable of repair, and if repairable, which part of the device 20 to repair. Additionally, performance data is valuable even if the data indicates that it is not possible to repair the device. By making it easier to access the performance data even after device failure, the manufacturer has increased access to detailed records of why the device failed. Quality control of devices is improved by having access to a larger sampling of device performance data. For example, a manufacturer could offer incentives to consumers to return data recorders from failed or malfunctioning devices to the manufacturer. The manufacturer could then determine the cause of failure of the device and make corrections and modifications to later produced devices based on the collected data.

Referring generally to FIGS. 4 through 8, exemplary embodiments of the present invention are shown wherein the device is a hard disk drive. It should be apparent to a person of ordinary skill in the art that a variety of electronic devices and components of an information handling system or the like may be employed and not depart from the spirit and scope of the present invention. Exemplary methods are also discussed. It is understood that the specific order, or hierarchy, are examples of exemplary approaches. Based upon user preferences, it is understood that the specific order, or hierarchy, can be rearranged while remaining within the scope of the present invention. The attached method claims present elements of the various steps in a sample order, and are not meant to be limited to the specific order or hierarchy presented.

Figure 4:
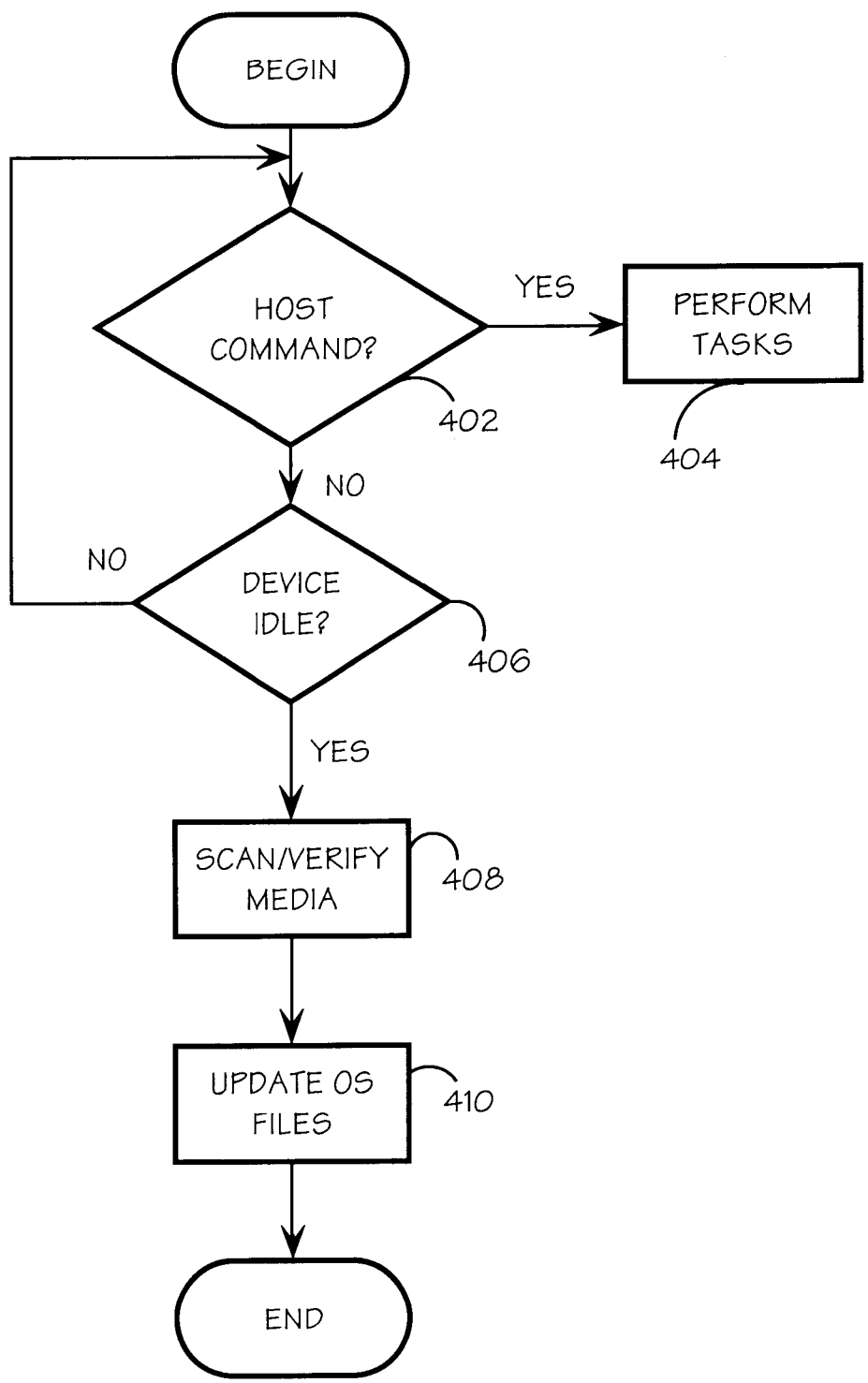
FIG. 4 is a flow diagram wherein an exemplary method of saving performance data without affecting the throughput and operation of a device is shown.

Referring now to FIG. 4, an exemplary method is shown wherein a data recorder 10 is connected to a device 20 (FIGS. 1 and 3) so as not to affect operation of the device 20. The data recorder 10 (FIGS. 1, 2 and 3) first determines if there is a host command 402. A host command may include any input received, output provided, or any other task performed by the device. If there is a command, the device is free to perform tasks 404 without interference from the data recorder. However, if no command is detected, the data recorder determines if the device is idle 406. If the device is idle 406, the data recorder scans and verifies the media 408. The media is the physical material used for storing data in a memory device such as a hard disk drive and floppy drive. Once the media is scanned, the data recorder updates operating system files 410 stored in the data recorder to reflect any valid changes to the operating system files.

Figure 5:
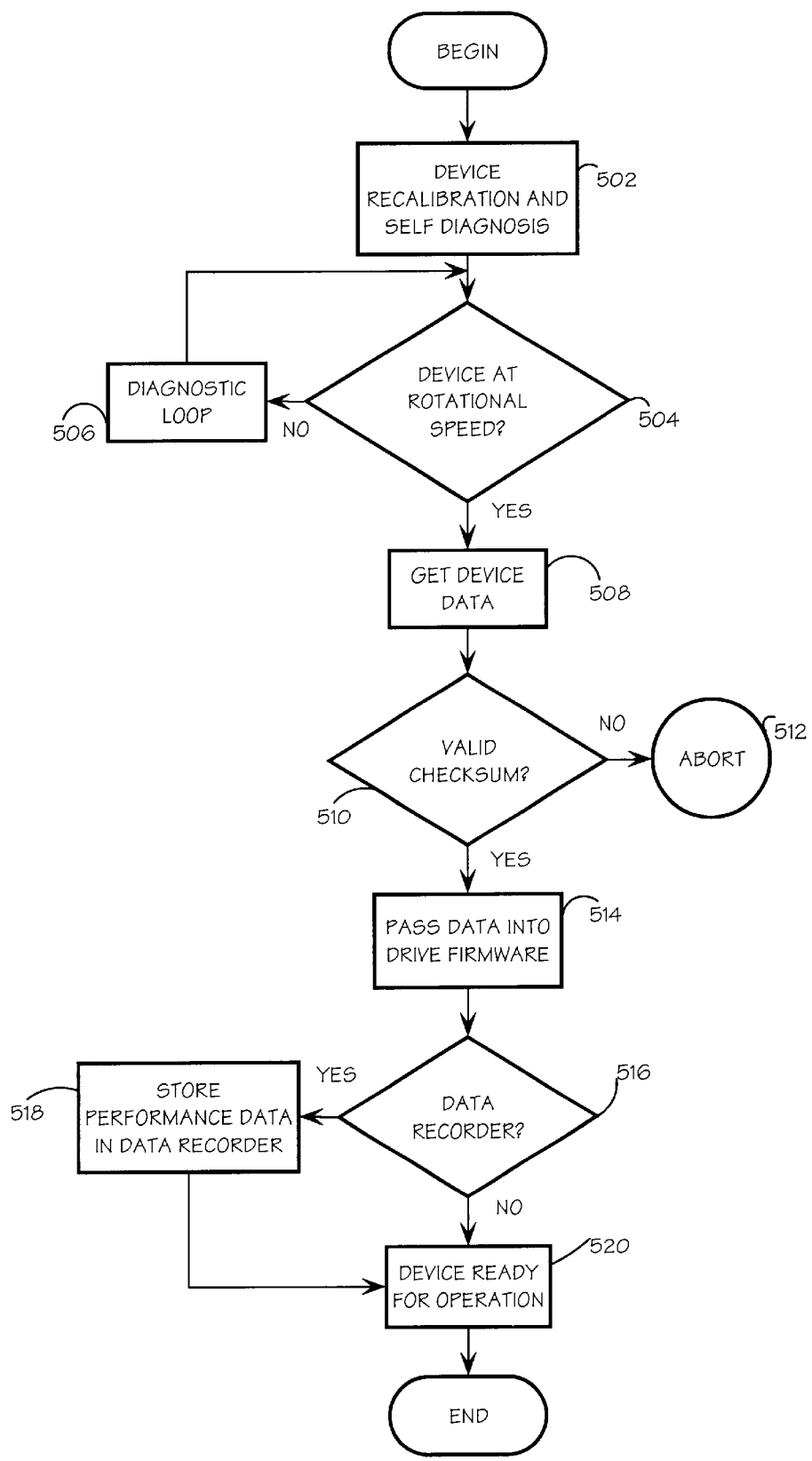
FIG. 5 is a flow diagram wherein an exemplary method of preventing the loss of performance data of a device is shown.

Referring now to FIG. 5, an exemplary method in which a data recorder may be updated so as to prevent the loss of performance data regarding a device is shown. After power is applied to a device, the device performs a recalibration and self diagnosis 502. After the self diagnosis 502, the device determines whether rotational speed 504 is reached. If the device is not at speed, the device may perform a diagnostic loop 506 to determine possible problems with the components of the device. Data derived from the diagnostic loop is stored to the data recorder, if present. After the device reaches rotational speed 504, the device may receive device data 508. Device data may include the device operating system, such as software routines and drivers. The device then determines if there is a valid checksum 510 for the device data 508. A checksum is a calculated value that is used to test data for the presence of errors that may occur when data is transmitted or written to a disk. If the checksum is not valid, the device aborts operation 512. If the checksum is valid, the device passes the data into the device firmware 514. The device may also query for the presence of a data recorder 516. If a data recorder is present, performance data is stored in the data recorder 518. However, if a data recorder is not present, the device may still operate for its intended use 520. Thus, installing or uninstalling the data recorder 10 would not effect device 20 operations.

Figure 6A:
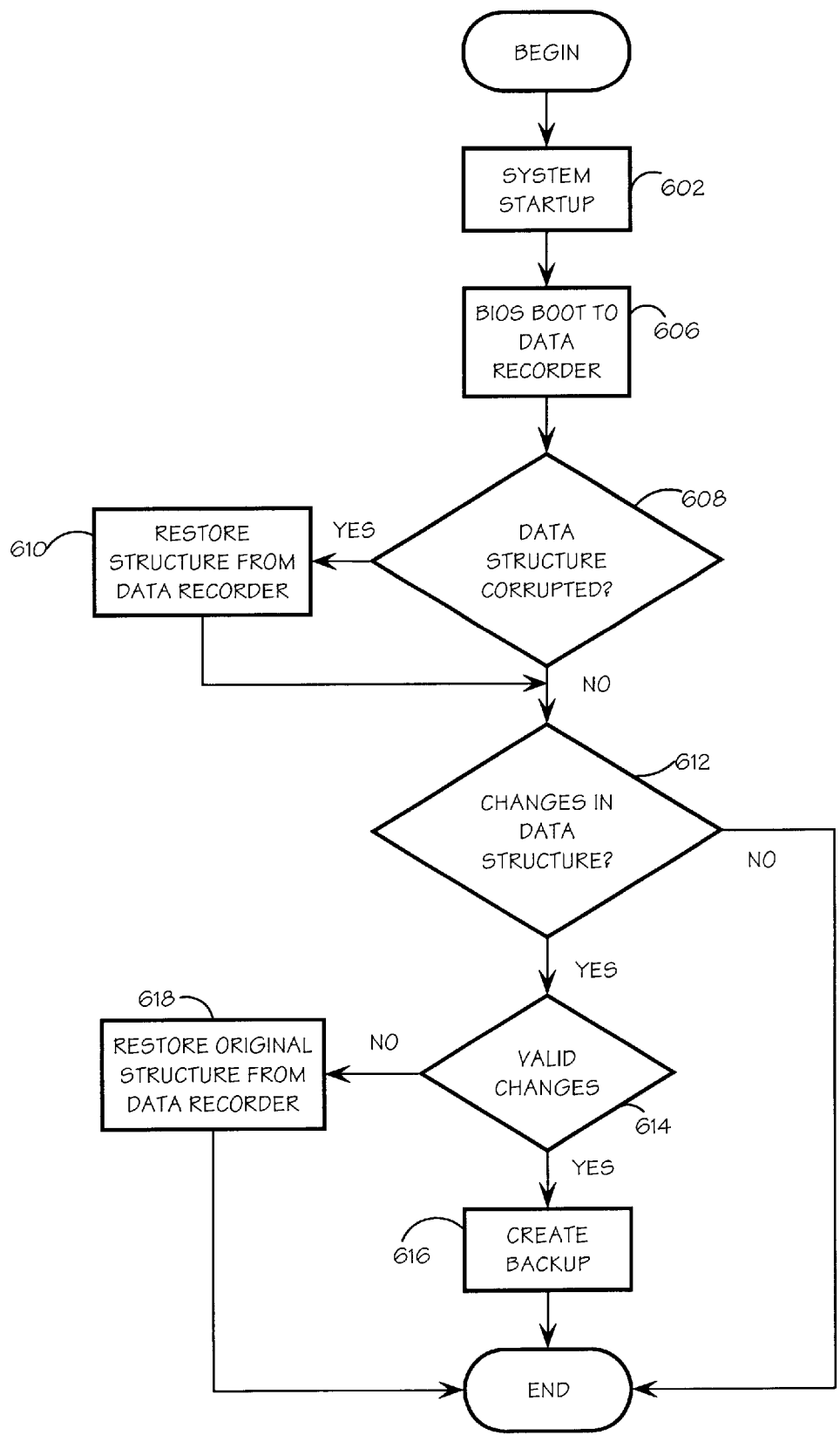
FIGS. 6A and 6B are flow diagrams wherein exemplary methods of repairing corrupted data structures are shown.
Figure 6B:
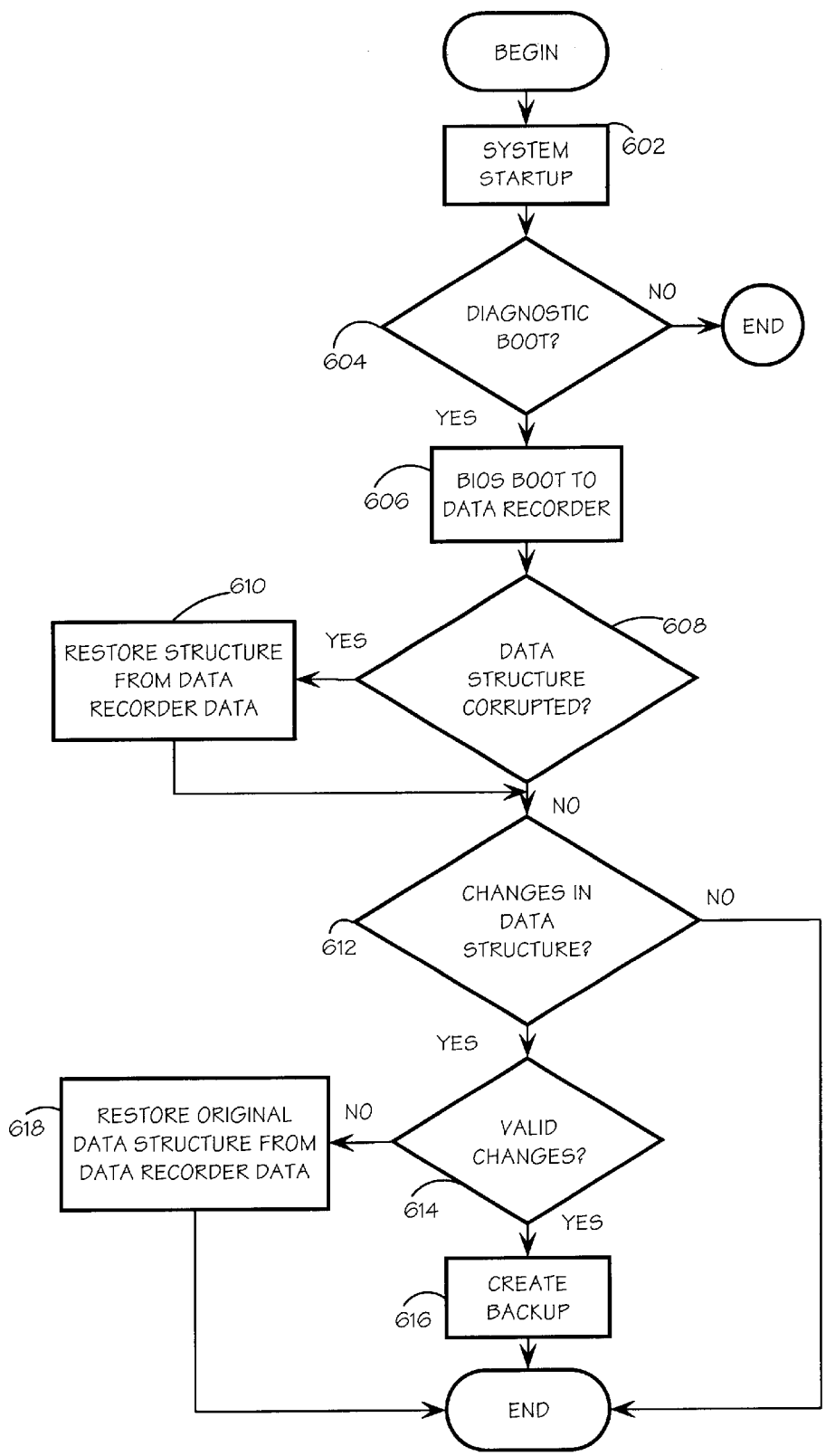

Referring now to FIGS. 6A and 6B, exemplary methods are shown describing how certain on-disk operating system structures, such as data structures, executable code and device drivers, may be backed up by the data recorder to a protected area of a hard drive, other hard drive, or another memory device in the system and what the risks would be in restoring those structures. A backup and restoration utility, hereinafter referred to as "OSTrack", may be used to backup and restore this data. In a preferred embodiment, this program is a component of disk drive utilities accessible by the data recorder for installing and accessing data recorder diagnostic programs. OSTrack may also include a utility to launch or initiate a backup or restoration program that resides elsewhere in the device or system, such as on a protected area of a disk. Preferably, if the backup and restoration utility or other programs reside on the disk protected area, the data recorder monitors these programs to ensure data integrity, such as reliability and security of the data, before a backup and restoration is initiated. For example, the data recorder may initiate a read/verify command to ensure the protected area is free of defects or perform a virus scan to ensure the data is free of viruses.

Preferably, OSTrack would run each time a user's system is started or restarted. To ensure availability should the normal data area of the device become corrupted, possibly rendering the system non-bootable, it may be preferable to include OSTrack as a part of the data recorder 10 (FIGS. 1 and 3). In another exemplary embodiment, OSTrack may reside in a protected area on a hard disk drive, such as the vendor specific area. However, this configuration may expose the data to risks associated with the possible malfunctioning of the device.

As shown in FIG. 6A, the basic input/output system (BIOS) may boot to either the data recorder or the protected area every time to further ensure availability. In this embodiment, after system startup 602, the BIOS boots directly to the data recorder 606. The data recorder, utilizing OSTrack, may then determine if data structures, such as the operating system including device drivers, are corrupted 608 by utilizing a diagnostic program, an example of which is hereinafter referred to as OSCheck. If a data structure is corrupted 608, OSCheck may initiate a utility to restore the structure from data stored in the data recorder 610. This data may include an image of the original download or an updated image due to changes made to the system as recorded by the data recorder. Next, OSCheck may determine if there are changes to the data structure 612. If there are changes, OSCheck determines if the changes are valid 614. For example, invalid changes 612 may be due to a variety of influences, such as a virus, corrupted software and hardware malfunction. If the changes are not valid, OSCheck restores the original structure from data stored in the data recorder. If the changes are valid, OSCheck initiates a backup 616 to update information stored to the data recorder.

In certain instances it may not be desirable to boot directly to the data recorder or protected area. For example, a manufacturer may desire that the information handling system boot as quickly as possible without extraneous programs being run. However, it may still be desirable to use a diagnostic program for repairing an operating system. An exemplary method of which is shown in FIG. 6B. In this embodiment, at system startup 602, OSTrack checks for a special "Diagnostic Boot" 604, such as a keypress combination. If a diagnostic boot 604 is detected, a diagnostic program, for instance OSCheck, is run. OSCheck may reside on the data recorder 606 or a protected area of the disk. Preferably, OSCheck accesses the backup data created by OSTrack. If OSCheck determines that one or more critical data structures are corrupted 608, it selectively restores those structures from OSTrack performance data 610. This performance data may include an image of the original download, or an updated image due to changes made to the system as recorded by the data recorder. OSCheck then determines if there are any changes 612 in the critical data structures on the drive. If the changes are valid 614, a new backup is created automatically 616. If the changes are not valid, OSCheck restores the original structure from data stored in the data recorder 618.

Booting directly to a data recorder or disk protected area may minimize BIOS changes required to support the data recorder/protected area system. If the BIOS simply booted to the protected area every time, there would be no need for the BIOS to check for any special "Diagnostic Boot" keypress combination 604 (FIG. 6B) during the boot process. The check for key presses may be done within the protected area code, specifically the OSTrack component. It might be preferable for the OSTrack program to be designed to run under the Microsoft®OS (MS-DOS®) (trademarks of the Microsoft Corporation). MS-DOS® files are compact and load quickly, which allows OSTrack to run every time the system boots, while being transparent to the user.

The following describes critical on-disk data structures and files required to boot the system to a MS-DOS® mode and to access volumes, directories and files on the hard disk drive. The operating system for the device includes traditional data structures, executable code, device drivers, or the like. In this exemplary embodiment standard MSDOS® or Microsoft® Windows® systems are described. It should be appreciated that other operating systems may be employed by the present invention as contemplated by a person of ordinary skill in the art without departing from the present invention. Although the master boot record and partition table may be backed up and restored regardless of what file system is used, all other data structures are specific to the file allocation table (FAT) file system, either FAT12/16 or FAT32. It should be appreciated that a person of ordinary skill in the art may modify these embodiments and not depart from the spirit and scope of the invention.

Master Boot Record (MBR)

The master boot record resides at logical block address zero of the hard disk drive. It shares logical block address zero with the partition table and resides within the first 446 bytes of the sector. Traditionally, the master boot record is not considered a data structure but rather executable code. The BIOS loads this code into memory and jumps to it as the last operation of the BIOS boot process. The only time the master boot record is validly changed during normal operation is if the user installs an operating system or any special boot code (Boot Manager). If OSTrack detects the master boot record had been changed it prompts the user to verify that the user has installed an operating system or type of Boot Manager or Int. 13h handlers. If not, there is a good chance that the master boot record was changed by a virus or by accidental overwriting of the sector by the BIOS or some application program. If the user had installed a program that legitimately modifies the master boot record, a new backup is made. If not, the user is given the option of running OSCheck or attempting to continue the boot process.

Partition Table

The Partition table resides at logical block address zero of the hard disk drive. It shares logical block address zero with the master boot record and resides within the last 64 bytes of the sector, not counting the 55AAh signature at the end of the sector. The only time a partition table is legitimately changed is if the user runs partitioning software, such as Partition Magic® by PowerQuest®, or completely re-partitions the drive. In certain instances, it is fairly easy to determine whether a partition table is valid. For example, all extended partition entries of the partition table must point to another partition table and all other entries must point to a MS-DOS® Boot Record. If the changed partition table fails this test, the same test may be performed on the backed up partition table. If there is no existing partition table, or the current and backed up partition tables fail the validity test; the partition table is reconstructed by scanning the hard disk drive for MS-DOS® Boot Records.

MS-DOS® Boot Record Data (BIOS Parameter Block)

On a hard disk, the BIOS parameter block is not strictly necessary since all information stored within it could be gathered from other sources, such as Int. 13h and the partition table. For legacy reasons, the BIOS parameter block is still used by the operating system and is therefore a critical component of the boot process. However, the fact that the information may be gathered elsewhere makes it possible to check the validity of the BIOS parameter block and even reconstruct it if necessary.

MS-DOS® Boot Record Code (DBR Code)

The purpose of a master boot record (described above) is to find the active partition, find the boot record code associated with that partition, load it into memory and jump to it. The boot record code in turn loads the operating system boot file (IO.SYS in the case of MS-DOS®/Windows®) and jumps to it. Every operating system has its own boot record code and many times different versions of the same operating system, or different file systems within the operating system, have different MS-DOS® boot record code areas. In the case of MS-DOS®/Windows® (excluding NT) there are only two different MS-DOS® boot record code versions, one for FAT12/16 and one for FAT32. For this reason it may not be necessary to back up the MS-DOS® boot record code where the user has installed a MS-DOS® file allocation table file system. Restoring the actual MS-DOS® boot record code for the appropriate file system may be adequate.

File Allocation Table (FAT)

Since the file allocation table is updated every time a file is created, written to or deleted, backing up and restoring the file allocation table may by somewhat impractical due to the frequency at which the file allocation table is changed. However, since there are two copies of the file allocation table on every volume, restoring the first file allocation table from the second may solve problems caused by the file allocation table being accidentally (or intentionally) overwritten. An image up to the last time the file allocation table is modified may be backed up and restored if desired.

Root Directory

New files or sub-directories are added to the Root Directory infrequently. It is feasible to back up the root directory every time it is changed. Preferably, just the directory is backed up and not the content of the files within the directory so as to save space. Restoring the root directory may be dangerous, since changes may have been made to the directory between the time of the last backup and the time that OSTrack was run, thereby resulting in loss of data identified and contained in the new or changed directories.

Sub-Directories

It may be preferable to scan and save the most important sub-directories, such as the WINDOWS/SYSTEM directory. In fact, it may be preferable to handle the critical system sub-directories along with the root directory so that a detailed image of the operating system of the device is taken.

Critical MS-DOS® Files

There are two files needed to boot a system to the MS-DOS® prompt, IO.SYS and COMMAND.COM. For MS-DOS® 6.22 or earlier the file MSDOS.SYS is also required. Even though MSDOS.SYS is not required on systems with Windows® 95 or later, it is a small file on those systems, so it may be backed up anyway. It may even be feasible to save the entire contents of all three files.

Critical Windows Files

Probably the most frequent reason why Windows® will not boot, or boots into Safe Mode, is because of problems with the Registry files USER.DAT and SYSTEM.DAT. Fortunately, Windows® makes backups of these files every time they are changed. These backups are generally renamed to the form SYSTEM.DAx (or USER.DAx) where "x" is a number starting at zero for the most recent backup. This means that OSTrack does not need to scan for changes in these files. To restore the files, OSTrack may rename the backups to have the DAT extension after deleting the current DAT files.

Figure 7:
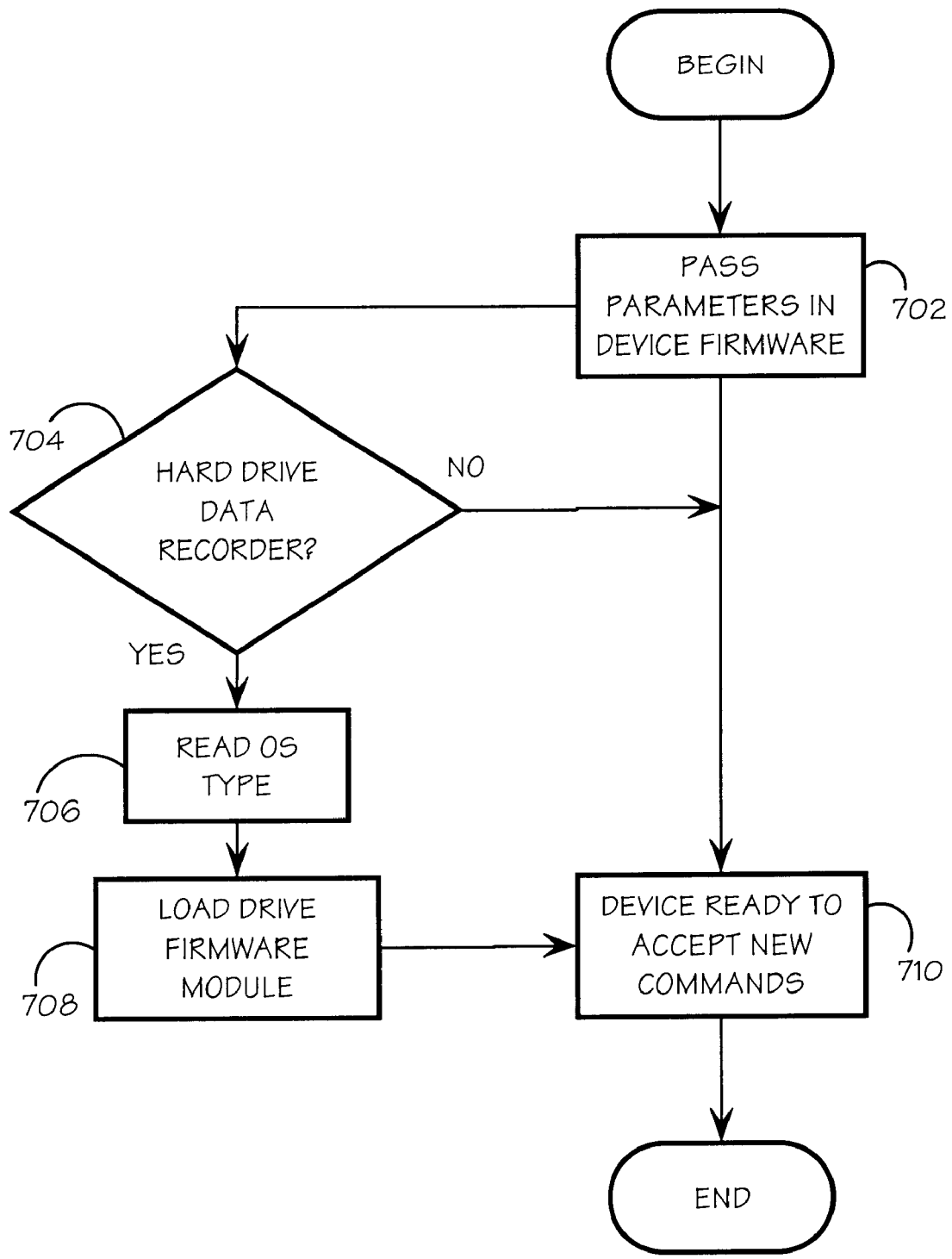
FIG. 7 is a flow diagram wherein a method of increasing system performance by loading a specific device module for a specific operating system is shown.

Referring now to FIG. 7, an exemplary method for optimizing a drive by determining which module to load when power is applied to the disk drive is shown. Vendors have difficulty accommodating the requirements of different operating systems each under a single firmware or cache algorithm so as to eliminate disk seeking operations and the overhead due to rotational latency delays. For example, most operating systems have unique storage and data seeking operations. A disk drive vendor may optimize the operating system, such as the driver of a disk drive, so as to efficiently perform those operations. For example, the vendor may have different firmware modules optimized for different operating systems, which in most cases are stored on the media. The data recorder and its program utilities (OSTrack) pinpoint which firmware module to use for a given operating system. After the operating parameters are passed into the drive firmware 702, OSTrack determines whether a data recorder 704 is installed. It may be preferable to configure the data recorder so that if a data recorder 704 is not present, the absence of the data recorder would not affect the operation of the device. For example, OSTrack could distinguish and verify which OS is loaded 706 by reading and comparing the date, time and the number of bytes of the common files that Microsoft® Windows® or other operating system uses. An example of verifying which Microsoft operating system is loaded includes:

Reading the WIN.COM

Windows 95 SR2.1 win.com 8/24/96 11:10 AM # of bytes 24,503

Windows 98 win.com 5/11/98 8:01 PM # of bytes 28,672

Windows NT WS win.com 8/3/96 12:00 AM # of bytes 20,752

NT 4.0 Server win.com 8/9/96 12:00 AM # of bytes 20,752

Once the data is read and saved by the data recorder, the data may be saved at a specific address known to the drive firmware/microprocessor. The drive may then load a specific module 708 corresponding to the operating system 706. The device is then optimized and ready to accept new commands 710.

Specific addressing may be set as a virtual-register-like pointer that refers to a byte position relative to a particular phase. The phase is defined as power is applied to the system. Two pointers or virtual registers may be defined within the data recorder to assist the drive to load the right module. A current pointer may be used to monitor which operating system is loaded. Preferably, the saved value states an address of one specific operating system. A second pointer may be utilized to describe the device operating systems, such as the driver software, to be used by the device. For example, the second pointer may indicate which module to load for a specific operating system. Therefore, by utilizing both pointers in combination, the current pointer may indicate the operating system and the second pointer may indicate which driver to utilize for the operating system indicated by the current pointer. The current pointer may retain its value unless the operating system is changed. If the operating system is changed the current pointer may be incremented, for instance by OSTrack, to describe the changes. The current pointer may be read and modified by the data recorder and read by the drive.

Figure 8:
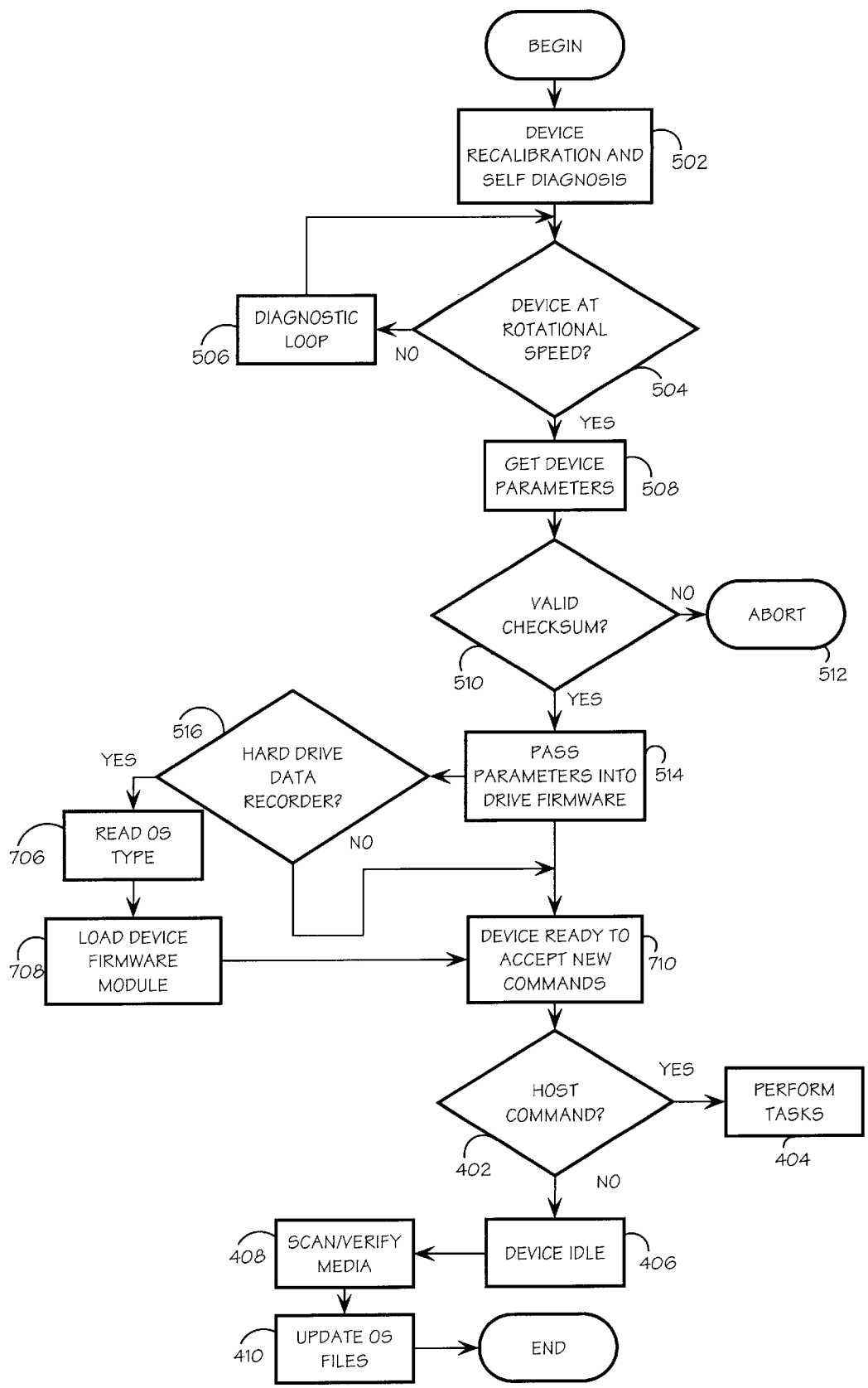

Referring now to FIG. 8, an exemplary method of preventing the loss of performance data, increasing system performance by loading a specific device module for a specific operating system, and saving performance data without affecting the throughput and operation of a device is shown. First, after power is applied to a device, the device performs a recalibration and self diagnosis 502. After the self diagnosis 502, the device determines if it has reached rotational speed 504. If the device is not at speed yet, the device performs a diagnostic loop 506 to determine possible problems with the components of the device. If the device is at rotational speed 504, the device receives the device data 508. The device data may include the device operating system and other software routines. The device then determines whether the checksum 510 is valid for the device data 508. If the checksum is not valid, the device aborts operation 512. If the checksum is valid, the device passes the data into the device firmware 514. At this point, the device queries for the presence of a data recorder 516. If a data recorder is present, the performance data stores to the data recorder 518. However, if no data recorder is present, the device is still ready to accept new commands 710. Next, the operating system is determined 706. Once the data is read and saved by the data recorder, which may be saved at a specific address known to the drive firmware/microprocessor, the drive may then load a specific module 708 corresponding to the operating system 706. The device is then optimized and ready to accept new commands 710. Finally, the data recorder 10 (FIGS. 1, 2, and 3) determines whether there is a host command 402. If there is a command, the device is free to perform tasks 404 without interference from the data recorder. However, if there is no command, the data recorder then determines whether the device is idle 406. If the device is idle 406, the data recorder scans and verifies the media 408. Once this is done, the data recorder updates the operating system files 410.

Figure 9:
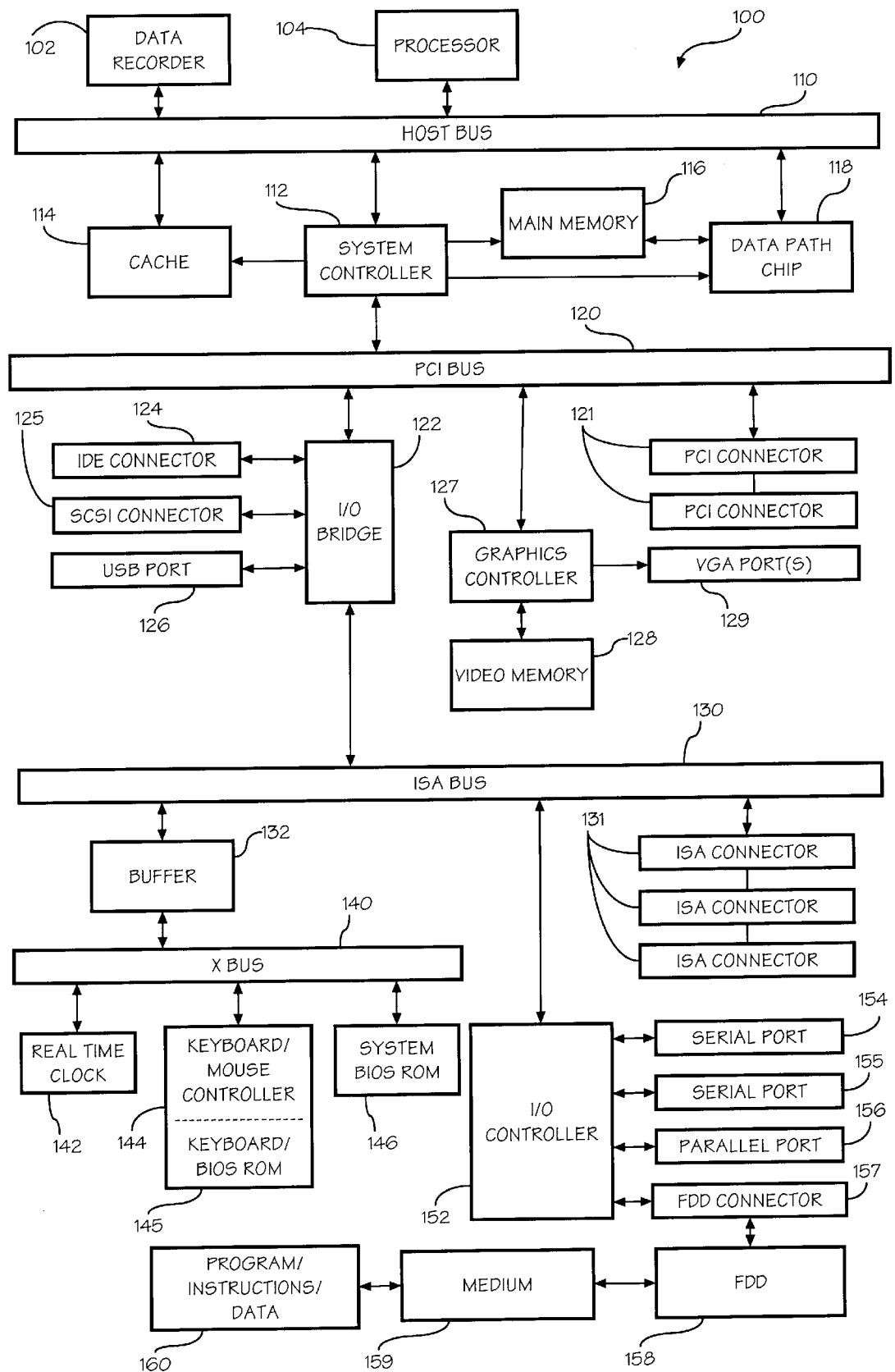
FIG. 9 is a block diagram of an information handling system operable to employ the present invention.

Referring now to FIG. 9, a hardware system in accordance with the present invention is shown. The hardware system shown in FIG. 9 shows a block diagram of an information handling system 100 in accordance with the present invention. A data recorder 102 is connected to a host bus 110 for communication with components and devices included with the information handling system 100. The data recorder 102 may include electrically erasable programmable read-only memory (EEPROM), flash ram, programmable read-only memory (PROM), erasable programmable read-only memory (EPROM), and a digital signal processor (DSP) with memory. The data recorder may also include a variety of non-semiconductor based memories, such as a magnetic tape, drum, floppy disk, hard disk, redundant array of independent disks (RAID), optical, laser disk, writeable compact disc read-only memory (CD-ROM), digital versatile disk read-only memory (DVD-ROM), digital versatile disk random-access memory (DVD-RAM), a floppy disk for utilization in a floppy disk drive, a floptical disk for utilization in a floptical drive, or a personal computer memory card for utilization in a personal computer card slot, as contemplated by a person of ordinary skill in the art. It should also be apparent that the data recorder may be connected at a variety of points in an information handling system 100 as desired by a person of ordinary skill in the art and not depart from the spirit and scope thereof.

In this embodiment, processor 104, system controller 112, cache 114, and data-path chip 118 are each coupled to host bus 110. Processor 104 is a microprocessor such as a 486-type chip, a Pentium®, Pentium II®, Pentium III® (Pentium® is a trademark of Intel Corp.), or the like suitable microprocessor. Cache 114 provides high-speed local-memory data (in one embodiment, for example, 512 KB of data) for processor 104, and is controlled by system controller 112, which loads cache 114 with data that is expected to be used soon after the data is placed in cache 112 (i.e. in the near future). Main memory 116 is coupled between system controller 112 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 9. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 104 and various peripheral devices, such as video, disk, network, or the like. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121, each of which accepts a standard PCI card. In one embodiment, I/O bridge 122 and graphics controller 127 are each integrated on the motherboard along with system controller 112, in order to avoid a board-to-connector-to-board signal crossing interface and thus provide better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for preferably up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which is stored data and/or program code 160. In one such embodiment, program code 160 includes code that controls programmable system 100 to perform the method described below. In another such embodiment, serial port 154 is connectable to a computer network such as the internet, and such network has program code 160 that controls programmable system 100 to perform the method described below. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 9 shows one exemplary embodiment of the present invention, however other bus structures and memory arrangements are specifically contemplated. In one embodiment, I/O bridge 122 is a chip that provides connection and control to one or more independent IDE connectors 124–125, to a USB (Universal Serial Bus) port 126, and to ISA (Industry Standard Architecture) bus 130. In this embodiment, IDE connector 124 provides connectivity for up to two standard IDE-type devices such as hard disk drives or CD-ROM (Compact Disk-Read-Only Memory) drives, and similarly IDE connector 125 provides connectivity for up to two IDE-type devices. In one such embodiment, IDE connectors 124 and 125 each provide the EIDE (Enhanced IDE) architecture. In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. It should be appreciated that modification or reconfiguration of information handling system 100 of FIG. 9 by one having ordinary skill in the art would not depart from the scope or the spirit of the present invention.

It is believed that the apparatus and method for storage of device performance data and repair systems of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A data recorder configured as part of an information handling system, the data recorder comprising:
    a memory device connected to at least one device of said information handling system for storing performance data obtained from the device;
    wherein the memory device is accessible after failure of the device; and
    wherein the memory device stores utilities for initiating diagnostic programs to control restoration of an operating system.

2. The data recorder as described in claim 1, wherein the memory device is disposed proximally to at least one of the device and the information handling system.

3. The data recorder as described in claim 1, wherein the memory device comprises a solid state memory device.

4. The data recorder as described in claim 3, wherein the memory device comprises at least one of electrically erasable read-only memory (EPROM), flash ram, programmable read-only memory (PROM), digital signal processor (DSP) with memory and erasable programmable read-only memory (EPROM).

5. The data recorder as described in claim 1, wherein the performance data includes at least one of error codes, diagnostic data, data structures, and device specific information.

6. The data recorder as described in claim 1, wherein the memory device is updated periodically by the device.

7. The data recorder as described in claim 6, wherein the memory device is updated by the device without affecting throughput and operation of the device.

8. The data recorder as described in claim 1, wherein the diagnostic programs include at least one of a backup and restoration program.

9. The data recorder as described in claim 1, wherein the utilities control replacement of the operating system from copies of the original data structures stored elsewhere on the system.

10. The data recorder as described in claim 1, wherein the information handling system comprises a display monitor configured to visually display results of said information handling system in a user-readable format.

11. The data recorder as described in claim 10, wherein the information handling system comprises a keyboard configured to receive instructions for said information handling system typed by a user.

12. The data recorder as described in claim 1, wherein said information handling system is a personal computer and said data recorder is configured to reside on a motherboard of said personal computer.

13. The data recorder as described in claim 1, further comprising:
    a case configured to enclose said data recorder; and
    a data drive configured to receive removable media via an opening in said case.

14. A data recorder, comprising:
    a memory device connected to at least one device for storing performance data obtained from the device;
    wherein the memory device is accessible after failure of the device;
    wherein the memory device stores utilities for initiating diagnostic programs to control restoration of an operating system;
    wherein the utilities control replacement of the operating system from copies of the original data structures stored elsewhere on the system;
    wherein the memory device restores the operating system from data stored in the memory device.

15. The data recorder as described in claim 14, wherein the memory device restores at least one of corrupted data structures and invalid changes from performance data.

16. A method for preventing loss of device performance data for a device configured as part of an information handling system, the method comprising:
    obtaining performance data from the device;
    storing the performance data on a data recorder configured as part of the information handling system; and
    initiating diagnostic programs to control restoration of an operating system, the diagnostic programs stored by the data recorder;
    wherein the data recorder is accessible after failure of the device.

17. The method as described in claim 16, wherein the performance data includes at least one of error codes, diagnostic data, data structure, and device specific information associated with said information handling system.

18. The method as described in claim 16, further comprising updating the data recorder periodically by the device.

19. The method as described in claim 18, wherein the data recorder is updated by the device without affecting throughput and operation of the device.

20. The method as described in claim 16, wherein the diagnostic programs include at least one of a backup and restoration program.

21. The method as described in claim 16, wherein the diagnostic programs control replacement of the operating system from copies of original data structures stored elsewhere on a system.

22. The method as described in claim 16, wherein the data recorded restores the operating system from data stored in the memory device.

23. The method as described in claim 16, wherein the data recorder provides the ability to restore at least one of corrupted data structures and invalid changes from performance data.

24. A method for preventing loss of device performance data, comprising:

obtaining performance data from a device;

storing the performance data on a data recorder;

determining if a host command has been received by the device;

testing whether the device is idle; and storing performance data of the device in the data recorder independent of the device if the device is idle;

wherein the data recorder is accessible after failure of the device.

25. A program of instructions stored on a medium readable by an information handling system for causing the information handling system to execute steps for preventing loss of performance data for a device configured as part of said information handling system, the steps comprising:

determining if a host command has been received by a device;

testing whether the device is idle;

obtaining performance data from a device; and storing the performance data of the device on a data recorder independent of the device if the device is idle;

wherein the data recorder is accessible after failure of the device.

26. The program of instructions as described in claim 25, wherein the performance data includes at least one of error codes, diagnostic data, data structure, and device specific information.

27. An information handling system, comprising:

a processor for executing a program of instructions on the information handling system;

a memory coupled to the processor for storing the program of instructions executable by said processor;

a device coupled to the processor; and a data recorder coupled to the device;

wherein the program of instructions configures the information handling system to obtain performance data from the device; and store the performance data on the data recorder;

wherein the data recorder storing the performance data is accessible after failure of the device; and wherein the information handling system determines if a host command has been received by a device;

tests whether the device is idle;

stores performance data of the device in a data recorder independent of the device if the device is idle.

28. The information handling system as described in claim 27, wherein the performance data includes at least one of error codes, diagnostic data, data structure, and device specific information.

29. The information handling system as described in claim 27, wherein the memory device is disposed proximally to at least one of a device and an information handling system.

30. The information handling system as described in claim 27, wherein the memory device comprises a solid state memory device.

31. The information handling system as described in claim 30, wherein the memory device comprises at least one of electrically erasable read-only memory (EEPROM), flash ram, programmable read-only memory (PROM), digital signal processor (DSP) with memory and erasable programmable read-only memory (EPROM).

32. The information handling system as described in claim 27, wherein the memory device is updated periodically by the device.

33. The information handling system as described in claim 32, wherein the memory device is updated by the device without affecting throughput and operation of the device.

34. The information handling system as described in claim 27, wherein said information handling system is a personal computer and said data recorder is configured to reside on a motherboard of said personal computer.

35. The information handling system as described in claim 27, further comprising:

a case configured to enclose said data recorder; and a data drive configured to receive removable media via an opening in said case.

36. An information handling system comprising:

a processor for executing a program of instructions on the information handling system;

a memory coupled to the processor for storing the program of instructions executable by said processor;

a device coupled to the processor; and a data recorder coupled to the device;

wherein the program of instructions configures the information handling system to obtain performance data from the device; and store the performance data on the data recorder;

wherein the data recorder storing the performance data is accessible after failure of the device; and wherein the memory device stores utilities for initiating diagnostic programs to control restoration of an operating system.

37. The information handling system as described in claim 36, wherein the diagnostic programs include at least one of a backup and restoration program.

38. The information handling system as described in claim 37, wherein the utilities control replacement of the operating system from copies of the original data structures stored elsewhere on the system.

39. The information handling system as described in claim 38, wherein the memory device restores the operating system from data stored in the memory device.

40. The information handling system as described in claim 39, wherein the memory device restores at least one of corrupted data structures and invalid changes from performance data.

* * * * *